United States Patent
Thompson

(10) Patent No.: US 8,392,386 B2
(45) Date of Patent: Mar. 5, 2013

(54) TRACKING FILE CONTENTS

(75) Inventor: Robert W Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 12/535,773

(22) Filed: Aug. 5, 2009

(65) Prior Publication Data

US 2011/0035428 A1    Feb. 10, 2011

(51) Int. Cl.
*G06F 7/00* (2006.01)
*G06F 17/00* (2006.01)
*G06F 12/00* (2006.01)
*G06F 17/30* (2006.01)

(52) U.S. Cl. .................... 707/695; 707/828; 707/830

(58) Field of Classification Search .................. 707/695, 707/755, 797, 828, 830
See application file for complete search history.

(56) References Cited

U.S. PATENT DOCUMENTS

| | | | |
|---|---|---|---|
| 5,761,677 A | 6/1998 | Senator et al. | |
| 6,460,055 B1 | 10/2002 | Midgley et al. | |
| 6,496,944 B1 | 12/2002 | Hsiao et al. | |
| 6,643,654 B1 * | 11/2003 | Patel et al. ............................ | 1/1 |
| 6,732,124 B1 | 5/2004 | Koseki et al. | |
| 6,877,109 B2 | 4/2005 | Delaney et al. | |
| 6,892,211 B2 | 5/2005 | Hitz et al. | |
| 7,234,077 B2 | 6/2007 | Curran et al. | |
| 7,353,242 B2 * | 4/2008 | Kodama ................................ | 1/1 |
| 7,783,611 B1 * | 8/2010 | Hamilton et al. ............. | 707/690 |
| 7,831,789 B1 * | 11/2010 | Per et al. ........................ | 711/162 |
| 7,958,199 B2 * | 6/2011 | Ferrari et al. .................. | 709/211 |
| 7,962,528 B1 * | 6/2011 | Pasupathy et al. ............ | 707/803 |
| 2002/0078244 A1 | 6/2002 | Howard | |
| 2002/0111956 A1 | 8/2002 | Yeo et al. | |
| 2003/0158862 A1 * | 8/2003 | Eshel et al. .................... | 707/200 |
| 2003/0236850 A1 * | 12/2003 | Kodama ........................ | 709/214 |
| 2005/0165862 A1 | 7/2005 | Loafman et al. | |
| 2005/0182799 A1 | 8/2005 | Hitz et al. | |
| 2006/0089953 A1 | 4/2006 | Chen et al. | |
| 2006/0259527 A1 | 11/2006 | Devarakonda et al. | |
| 2007/0028303 A1 | 2/2007 | Brennan | |
| 2007/0244877 A1 | 10/2007 | Kempka | |
| 2008/0046475 A1 | 2/2008 | Anderson et al. | |
| 2008/0275925 A1 * | 11/2008 | Kimmel ........................ | 707/204 |

* cited by examiner

*Primary Examiner* — Merilyn Nguyen
(74) *Attorney, Agent, or Firm* — Garg Law Firm, PLLC; Rakesh Garg; Jeffrey S. LaBaw

(57) ABSTRACT

A method, system, and computer usable program product for tracking file contents are provided in the illustrative embodiments. A content inode corresponding to a content is created, the content being in a file, the file being stored in a computer memory, and the file being locatable using a file system executing under an operating system in a data processing system. An operation, a component, an application, or a combination thereof, is detected operating with respect to the content. A descriptor and a location corresponding to the operation, the component, the application, or the combination thereof, is determined and added to the content inode. A location identifier corresponding to the location is added to the content inode. The content inode with the added descriptor and location identifier enables an application to learn about the operation, the component, the application, or the combination thereof, having operated with respect to the content.

17 Claims, 8 Drawing Sheets

FIG. 8

```
type def struct {
short major,
short minor
} dev_t;
typedef struct {
unsigned long offset;
unsigned long address;
unsigned long length;
} extent_t/* 3 tuple representing a contiguous section of blocks on media */
typedef struct operator_descriptor {
int descriptor_type; /* does descriptor describe cp,mv, snapshot, defrag blocks,mirror,
backup,.... */
time_t timestamp /* time this inode-descriptor was created */
typedef union{
copy_descriptor_t;
mv_descripttor_t;
snap_descriptor_t;
defrag_descriptor_t;
backup_descriptor_t;
mirror_descriptor_t;
remove_descriptor_t;
....
..../* descriptors for other operations
} operator_descriptor_t Actual content inode:
typedef struct content_inode {
long content_inode_number;
char[300] content_inode_label; /* description of content of secure file */
long op_count; /* number of operator descriptors */
primary_descriptor_t primary_cd; /* inode descriptor associated with inode of original
file created */
operator_descriptor_t operator_cd[....]; /* array of operator descriptors associated with
operations done on
the file */
} content_inode_t
```

FIG. 9

```
typedef struct primary_descriptor {
/* this could be replaced by pointer to
inode of file used in content command
*/
dev_t lv of file copied /* major and
minor number of snapshot */
int num_extents; /* number of extents */
vector_t ext[...] /* an array of extents
that has num_extents entries */
} primary_descriptor_t
typedef struct cp_descriptor {
/* this could be replaced by pointer to
inode of file created when copied */
dev_t lv of file copied /* major and
minor number of snapshot */
int num_extents; /* number of extents */
vector_t ext[...] /* an array of extents
that has num_extents entries */
} cp_descriptor_t
typedef struct mv_descriptor {
/* this could be replaced by pointer to
inode of target file created */
dev_t lv of file copied /* major and
minor number of snapshot */
int num_extents; /* number of extents */
vector_t ext[...] /* an array of extents
that has num_extents entries */
} mv_descriptor_t
typedef struct snap_descriptor {
dev_t dev_snap /* major and minor
number of snapshot */
int num_extents; /* number of extents */
vector_t ext[...] /* an array of extents
that has num_extents entries ( this is
general definition; actual
definiton could be implementation
specific)
These vectors represent area on
snapshot related to file */
} snap_descriptor_t
```

```
typedef struct defrag_descriptor {
int num_vectors; /* number of vectors */
dev_t dev_snap /* major and minor
number of lv defrag command operated
on */
vector_t ext[...] /* an array of vectors that
has num_vectors entries ( this is general
definition; actual
definiton could be implementation
specific)
These vectors represent area on lv that
have blocks released by defragfs that
still contain content related
to file */
} defrag_descriptor_t
typedef struct backup_descriptor {
int media_type; /* type of media used for
backup disket,tape, cd, dvd, etc*/
char[300] media_description; /* a
description of where media is */
} backup_descriptor_t
typedef struct mirror_descriptor {
dev_t logical volume of filesystem
mirrored /* major and minor number of
snapshot */
int num_mirrors; /* number of mirrors */
dev_t mirror01; /* device of mirror01 */
vector_t mirror1[...]; /* an array of extents
for mirror01 device */
dev_t mirror02; /* device of mirror02 */
vector_t mirror2[...]; /* an array of extents
for mirror02 device */
dev_t mirror03; /* device of mirror03 */
vector_t mirror3[...]; /* an array of extents
for mirror03 device */
} mirror_descriptor_t
typedef struct remove_descriptor {
dev_t lv of file removed /* major and
minor number filesystem */
int num_extents; /* number of extents */
vector_t ext[...] /* an array of extents that
has num_vectors entries */
} remove_descriptor_t
```

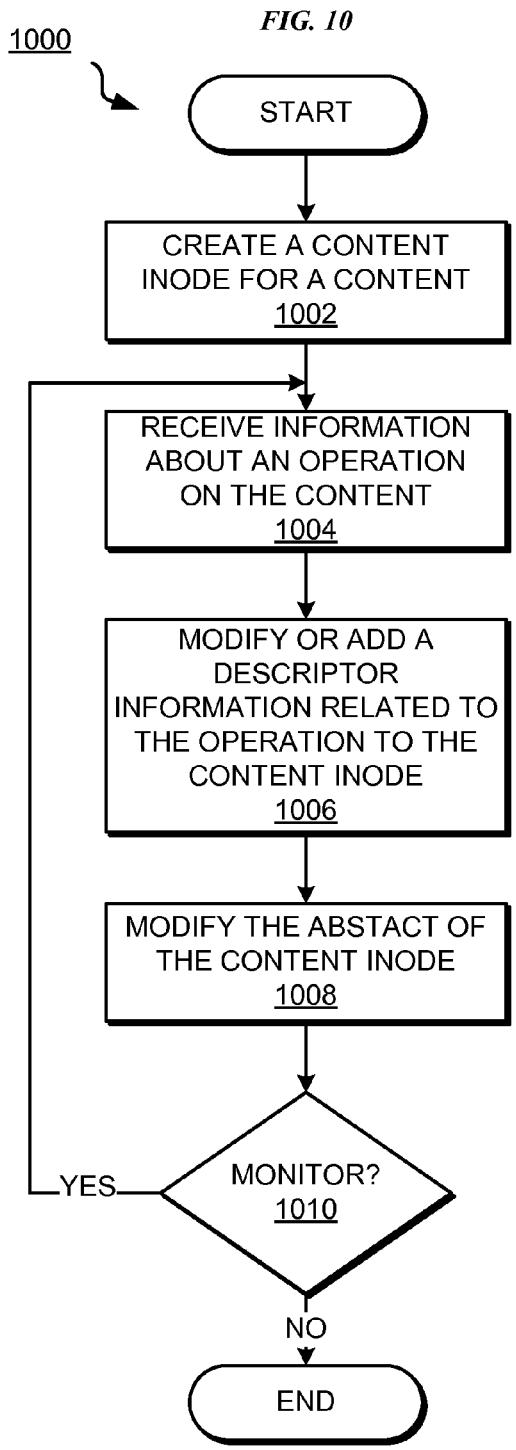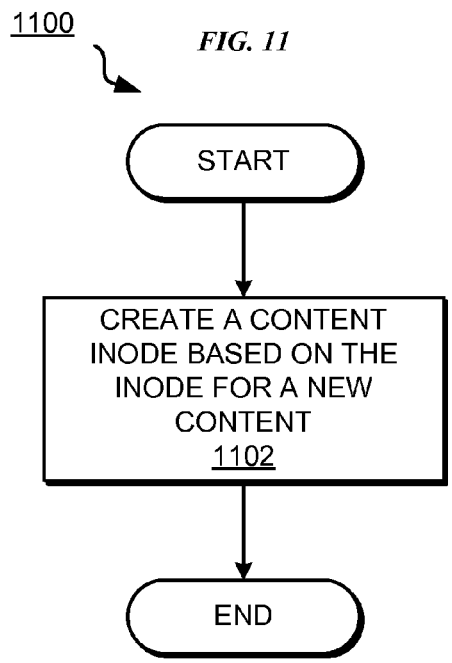

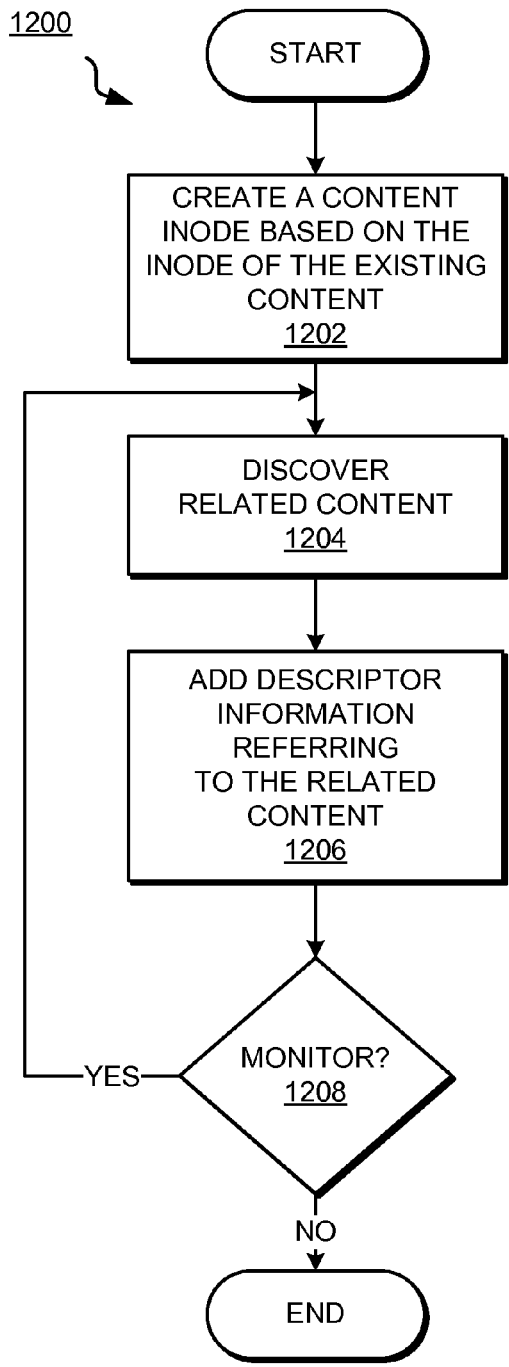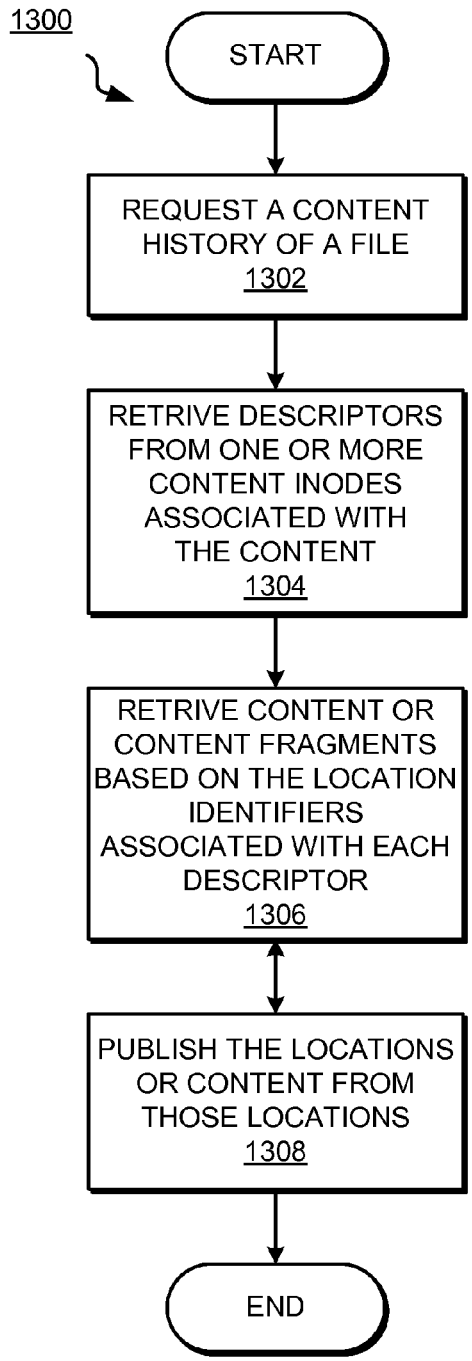

TRACKING FILE CONTENTS

BACKGROUND OF THE INVENTION

1. Field of the Invention

The present invention relates generally to an improved data processing system, and in particular, to a computer implemented method for managing data in a file system. Still more particularly, the present invention relates to a computer implemented method, system, and computer usable program code for tracking file contents.

2. Description of the Related Art

A data processing system generally keeps track of data by managing certain information about files known to the data processing system's operating system. A file is a data structure used for storing data. An operating system manages information about files using a file system. A file system is a data structure that maintains certain information about the files known to the operating system.

The information about a file that is maintained in a file system is called an inode. An inode is a data structure where the operating system stores certain attributes of a file. For example, a typical inode for a file stores information about a creation time, last modification time, size, and location of the file.

Contents of a file are the information stored in a file. For example, contents of a word processing file may be the information pertaining to a legal contract that is stored in that file. As another example, contents of a spreadsheet file may be the accounting data that is stored in the spreadsheet. As another example, contents of a text file may be the software code that is stored therein. Generally, any type of content can be stored in a suitable file, and an operating system can manage that file using the file's inode in the operating system's file system.

Presently, as applications and users manipulate a file, the inode information is updated as to the attributes of the file stored in the inode. For example, the time of last modification may be a file attribute, and the inode may be updated to reflect the time of the file manipulation. As another example, the size of the file may be another attribute of the file in the corresponding inode. If a changed size of the file results from the file manipulation, such as when a user edits a file, the new size of the file is recorded in the inode.

SUMMARY OF THE INVENTION

The illustrative embodiments provide a method, system, and computer usable program product for tracking file contents stored in a computer memory. According to the invention, an embodiment creates a content inode corresponding to a content, the content being in a file, the file being stored in a computer memory, and the file being locatable using a file system executing under an operating system in a data processing system. The embodiment detects an operation, a component, an application, or a combination thereof, operating with respect to the content. The embodiment determines a descriptor and a location corresponding to the operation, the component, the application, or the combination thereof. The embodiment adds the descriptor to the content inode. The embodiment adds a location identifier corresponding to the location to the content inode. The content inode with the added descriptor and location identifier enables an application to learn about the operation, the component, the application, or the combination thereof, having operated with respect to the content.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 8 depicts an example pseudo-code for implementing a portion of the content inode in accordance with an illustrative embodiment;

FIG. 9 depicts an example pseudo-code for implementing another portion of the content inode in accordance with an illustrative embodiment;

FIG. 10 depicts a flowchart of a process for tracking file contents in accordance with an illustrative embodiment;

FIG. 11 depicts a flowchart of a process of creating a content inode in accordance with an illustrative embodiment;

FIG. 12 depicts a flowchart of a process of modifying a content inode referencing an existing content in accordance with an illustrative embodiment; and FIG. 13 depicts a flowchart of an example process of using the content in accordance with an illustrative embodiment.

DETAILED DESCRIPTION OF THE PREFERRED EMBODIMENT

Figure 1:
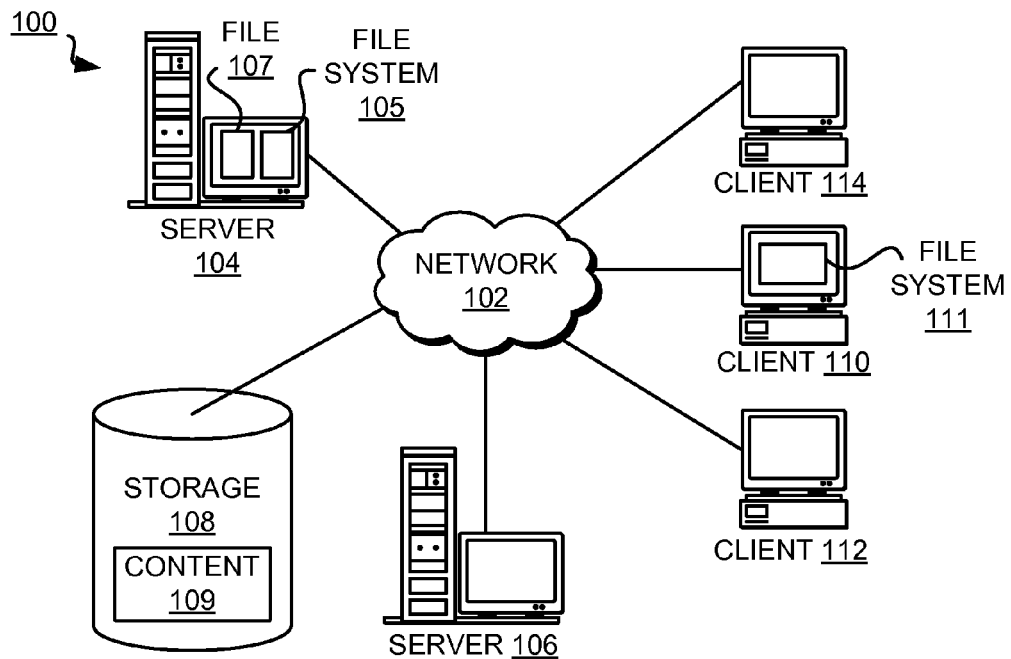
FIG. 1 depicts a pictorial representation of a network of data processing systems in which illustrative embodiments may be implemented.

The invention recognizes that presently used inodes or equivalents thereof, in present file systems do not track the content of files they reference as operations are applied to them distributing the content of the file in different locations. The present inode is limited to keeping track of the present known locations of the file's data after the operation occurs.

The invention recognizes that many operations manipulate the contents of files. The invention recognizes that the present inode based file system architecture fails to keep track of the movement of the contents, all or portions thereof, of the file.

For example, a "copy" command may not modify a file or contents thereof but create a copy of the file elsewhere. Presently, the new copy of the file is indexed by a new inode in the file system, resulting in two inodes—one for the copied file and the other for the new copy of the copied file. However, the inode of the copied file does not reflect that the contents of the file now exist in two places. Thus, an application, such as an auditing application, wanting to know where the contents of the copied file may be scattered, will know only what the attributes of the inode of the copied file tell, and not know that another inode referencing the copy should also be considered.

As another example, a "remove" or "delete" command on a file presently may delete only the inode of that file from the file system but not actually erase the contents from where the file contents were stored. Consequently, while an application, such as a data-security application, may consider a file deleted, the contents of the file may remain on the storage device.

The invention recognizes that tracking the contents of files over time as a result of operations performed with respect to the file or the contents of the file is useful. As some examples, tracking the contents may be important for data-security, proper clean-up of data and data storage devices, restoration of corrupted data, reconstruction of data from lost operations, and generating audit trails of data.

Of course, these example uses are not limiting on the invention and an embodiment of the invention may be usable for other purposes within the scope of the invention. Many other applications, circumstances, and uses of tracking the contents of files will be apparent to those of ordinary skill in the art from this disclosure. For example, in a virtual input/output (I/O) environment, many translations and indirect references to the content may be made to make a virtual data resource including the content available to a data processing system.

The illustrative embodiments used to describe the invention generally address and solve the problems related to movement, distribution, manipulation, translation, or other operations performed with respect to contents of files in one or more file systems. The illustrative embodiments provide a method, computer usable program product, and data processing system for tracking file contents.

The illustrative embodiments describe and use a content inode to track file contents. A content inode is a data structure associated with and referencing all or part of a file's contents in a file system. The content inode is further configurable to manage historical information about applications and components thereof that may have operated with respect to the contents of the associated file. The content inode also records operations performed with respect to the content or portions thereof.

The content inode may also include, as an abstract, some information describing the content to which the content inode pertains. For example, a content inode corresponding to a spreadsheet file may describe the financial nature of the contents or date-range of the financial information, may include keywords and other descriptors suitable for identifying or characterizing the contents, or a combination thereof.

The abstract of a content inode may additionally be configured to track the content that has been in one or more files over a period of time. The abstract in the content inode may also include a textual or alternative modification history of the associated content. For example, when a mirror of a content is created, the content inode may record the mirror operation, and also note in the abstract other information about the mirror site, such as a uniform resource locator (URL) that may be helpful to some applications.

Furthermore, the content inode corresponding to a file may be created when the file is created and the presently used inode is created. The content inode corresponding to a file may also be created for existing content and files and may be populated with the information from the existing inode and information discovered about the previous operations on the content or existence of related portions of the content. Once created, the content inode of a file tracks the movement, distribution, manipulation, translation, or other operations performed with respect to contents of files in one or more file systems.

Additionally, a content inode according to illustrative embodiments can be configured to track a set of operations or a set of components that operate with respect to the content. A set of operations is one or more operations. A set of components is one or more components. The content inode can also be configured such that the content inode tracks only a portion of the content, ignores a portion of the content, or tracks a set of content. A set of content is content or a portion thereof spanning one or more files.

Using the content inode of the illustrative embodiments, a system or an application can determine what operations have been performed with respect to the contents of a file from a given starting time in the lifetime of the file. Using the illustrative embodiments, a system or an application can also report, where all or portions of the contents, copies thereof, mirrors thereof, or residues and scraps thereof, of the file may reside at a time of reporting. A copy of the content is a clone of the content in a different location in a storage device. A mirror of the content is a copy of the content available from a different location in a storage device or data network. A residue of the content is a portion of the content that remains in a location in a storage device after the content has been removed or relocated. A scrap of the content is a portion of the content that remains in a location in a storage device where the content was temporarily placed, such as in a cache, after the temporary need ceases to exist.

Of course, these are only a few examples of the forms portions of a given content may take over a lifetime of the corresponding file. Depending on a particular configuration, content or portions thereof may appear in storage devices in other forms, for other purposes, and by other mechanisms, which are all within the contemplated scope of the invention.

Furthermore, using the illustrative embodiments, a system or an application may also determine which components of an operating system executed with respect to the content or portions thereof. For example, file transfer protocol (FTP) is a service of operating systems that facilitates transfer of files from one location to another. Tracking this type of operation may be useful if contents of files are to be tracked outside of host machine.

As another example, in a distributed data environment, virtual I/O servers may create virtual references to the contents of a file. The illustrative embodiments can provide information about these and any other components of the operating system or any other application, that may have operated with respect to all or portions of a given content during a given time period.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, data structures, designs, layouts, schematics, and tools only as examples and are not limiting on the illustrative embodiments. The illustrative embodiments may be implemented with respect to any type of data or data source, file or file system, and contents therein.

Furthermore, the illustrative embodiments are described in some instances using particular software tools and data processing environments only as an example for the clarity of the description. The illustrative embodiments may be used in conjunction with other comparable or similarly purposed systems, applications, or architectures. For example, some illustrative embodiments that are described in conjunction with a physical data processing system can be used in conjunction with a virtual data processing system or a logical partitioned system within the scope of the illustrative embodiment.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
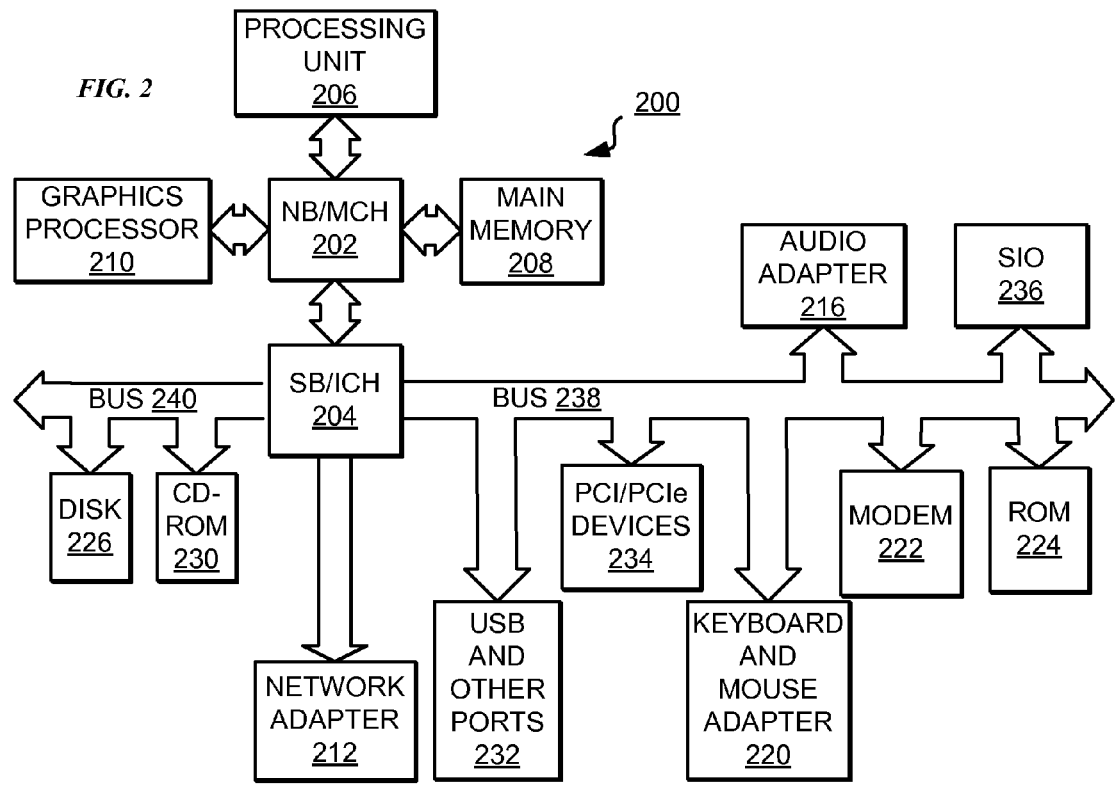
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon. For example, server 104 may include file system 105. File system 105 may reference many files accessible from server 104, including file 107. Storage unit 108 may include content 109. Client 110 may also include file system 111. File systems 105 and 111 may be similar or different from one another depending on the operating systems executing on server 104 and client 110 respectively. Content 109, file 107, or both, may be in forms that may or may not be referenceable by a file system and consequently not capable of being managed using the presently available inodes and file systems.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Memories, such as main memory 208 and ROM 224, are some examples of a computer usable storage devices. Hard disk drive 226 and CD-ROM 230 are some examples of a computer usable storage devices including computer usable storage medium, and may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
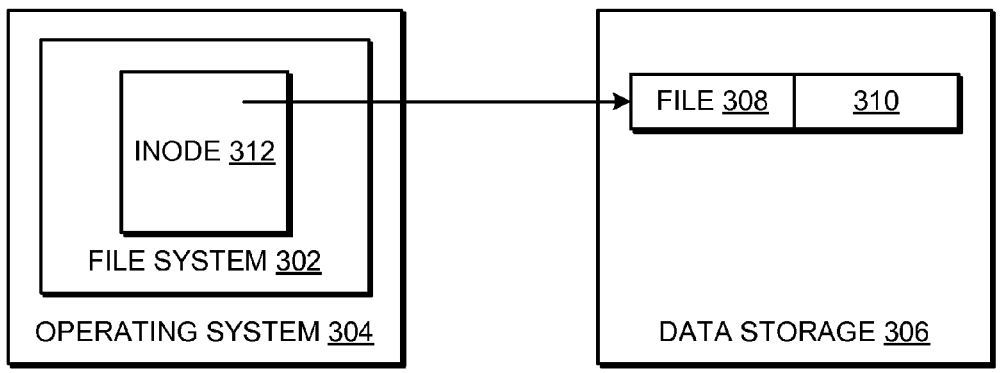
FIG. 3 depicts a block diagram of an inode based file system in which an illustrative embodiment may be implemented.

With reference to FIG. 3, this figure depicts a block diagram of an inode based file system in which an illustrative embodiment may be implemented. File system 302 may be implemented using file system 105 in FIG. 1. Operating system 304 may be an operating system under which file system 302 operates. Data storage 306 may be a data storage device accessible from the data processing system where operating system 304 may be executing.

Blocks 308 and 310 may be data storage blocks in data storage 306. Data storage 306 may include any number of blocks similar to blocks 308 and 310. A set of such blocks may be used to store data, such as files with content. A set of blocks is one or more blocks.

In the example depicted in this figure, blocks 308 and 310 are both used to store data of a file. Inode 312 is a presently used inode maintained within file system 302, and is used to reference the file occupying blocks 308 and 310. For example, inode 312 may include as an attribute a pointer to the starting address of block 308 such that the file is locatable beginning at block 308 using that attribute.

The invention recognizes that inode 312 or a present equivalent thereof fails to track the content of the file stored at blocks 308 and 310. Particularly, inode 312 includes no record of any operations that have been historically performed on the file contents, any applications or components that may have manipulated the file contents, or any abstract or descriptor of the file contents and manipulations thereof.

Figure 4:
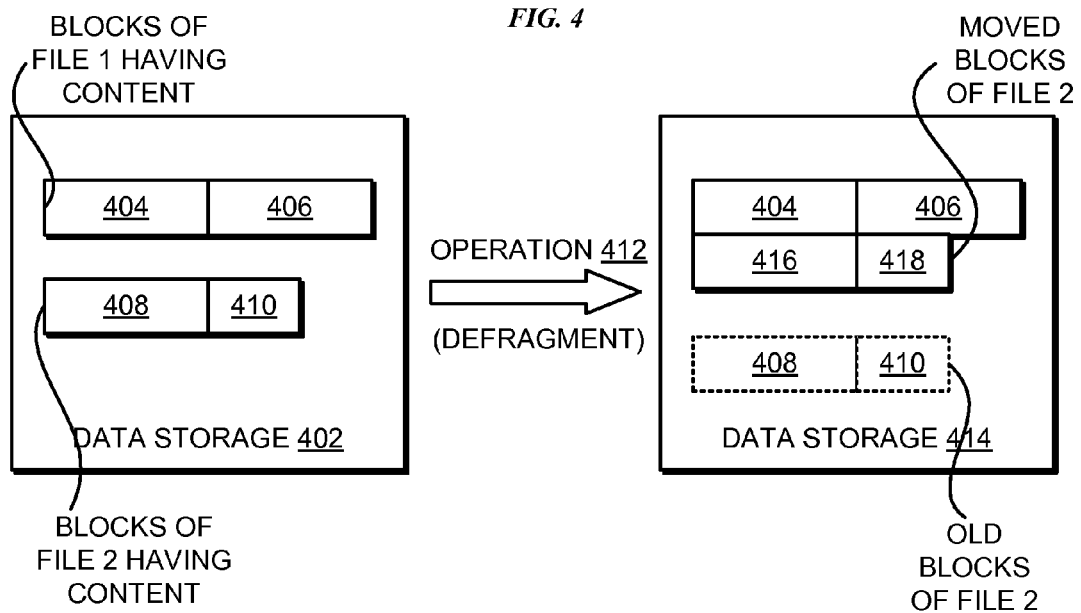
FIG. 4 depicts a block diagram of an example operation that manipulates file contents, whose execution can be tracked in accordance with an illustrative embodiment.

With reference to FIG. 4, this figure depicts a block diagram of an example operation that manipulates file contents, whose execution can be tracked in accordance with an illustrative embodiment. Data storage 402 may be implemented using data storage 306 in FIG. 3.

As an example to illustrate a failing of the present inode and a feature of an illustrative embodiment, data storage 402 is shown to include two files. File 1 may occupy blocks 404 and 406, and file 2 may occupy blocks 408 and all or part of block 410. Files 1 and 2 may each have content and such content may be of any type without limitation.

Defragmentation of a data storage device is a commonly known operation for rearranging the occupied and vacant blocks on the storage device such that the occupied blocks lie as contiguously as possible. As a consequence of performing the defragmentation operation, the data representing content at certain occupied blocks is moved to other blocks that may be contiguous with certain other occupied blocks.

Operation 412 is such a defragmentation operation. Data storage 414 is the post-defragmentation view of data storage 402. As an example, data from blocks 408 and 410 in data storage 414 has been moved to blocks 416 and 418 respectively by operation 412. Blocks 416 and 418 lie contiguous with blocks 404 and 406 in data storage 414.

During operation 412, moving the data of old blocks of file 2, to wit, blocks 408 and 410, to the new blocks of file 2, to wit, blocks 416 and 418, does not erase the data in blocks 408 and 410. Blocks 408 and 410 are simply marked as vacant and are overwritten when the data of some other file is written in those blocks. Until such time as blocks 408 and 410 are overwritten, blocks 408 and 410 continue to hold the contents of file 2 as a result of operation 412, although such content is not refrenceable as file 2's content after operation 412.

Nonetheless, the invention recognizes that having blocks of content remaining in data storage blocks poses a security risk. For example, tools exist to read unreferenced blocks on a data storage device and recover the content found therein. Presently, because inodes and equivalents thereof fail to keep track of such residual content, present inodes and their equivalents expose the contents to a data security risk.

A content inode in accordance with an illustrative embodiment may be configured to track old and new blocks occupied by the contents of file 2 as depicted in FIG. 4. Accordingly, the illustrative embodiment may allow an application to determine whether residual content fragments related to file 2 remained on a data storage device after an operation such as operation 412 was performed at a prior time. The application, such as an audit application, may then be able to report that as a result of defragmentation operation 412, not only blocks 416 and 418, but also blocks 408 and 410 in data storage 414 should be regarded as containing file 2 contents. Thus, the illustrative embodiment may provide improved data security to the file contents of file 2 as compared to presently used inodes and similar data structures in present file systems.

Figure 5:
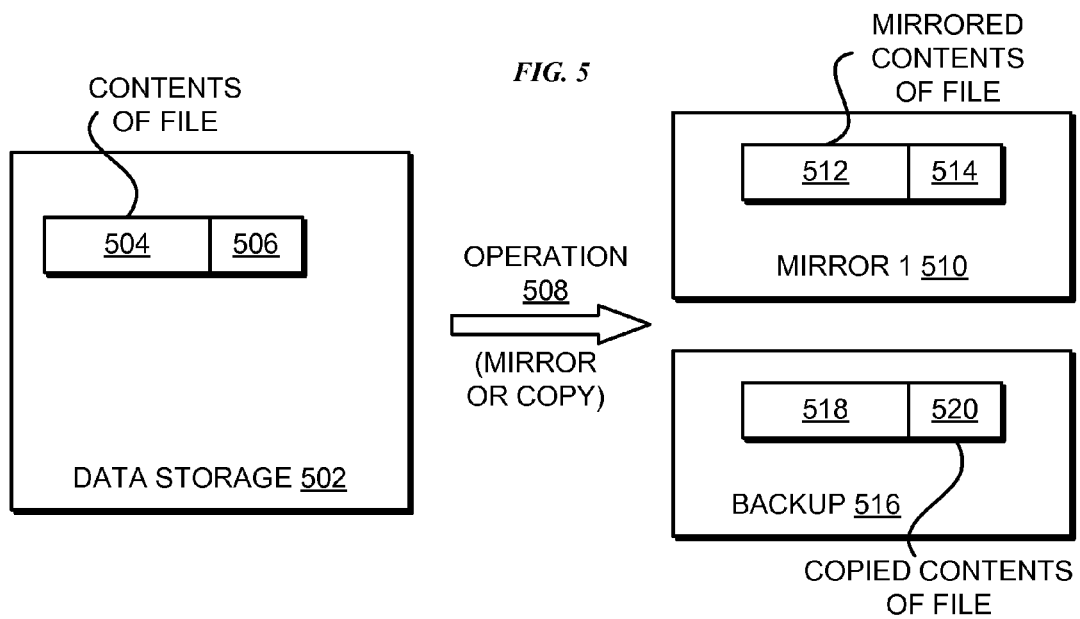
FIG. 5 depicts a block diagram of another example operation that manipulates file contents, whose execution can be tracked in accordance with an illustrative embodiment.

With reference to FIG. 5, this figure depicts a block diagram of another example operation that manipulates file contents, whose execution can be tracked in accordance with an illustrative embodiment. Data storage 502 may be implemented using data storage 402 in FIG. 4.

As an example to illustrate a failing of the present inode and a feature of an illustrative embodiment, data storage 502 is shown to include a file. The file may occupy blocks 504 and 506 in data storage 502. The file may include content and such content may be of any type without limitation.

Mirroring is an operation on a file or a data structure by which the file or the data structure, when requested, can be provided from more than one location. Mirror operation results in multiple copies of the contents of the file or data structure being mirrored. A "copy" operation results in a cloning of the contents of a file or data structure to a different location or data storage.

In one embodiment, operation 508 may be a mirror operation. Data storage 510 is the post-mirroring mirror location for the contents that, pre-mirroring, were only occupying blocks 504 and 506 in data storage 502.

During mirror operation 506, contents are copied from data storage 502 to mirror location in data storage 510. The mirror of the file may occupy, as an example, blocks 512 and 514 in mirror location data storage 510. The invention recognizes that having blocks of content mirrored in this manner poses a security risk. For example, an application tracking the file using present inodes will only find the file in blocks 504 and 506 in data storage 502 and not the mirror of the file in blocks 512 and 514 in data storage 510. External records have to be maintained that inform an application that a mirror of the file exists elsewhere and should also be considered. Such records, being external to the inode of the file can easily become outdated, disassociated with the file, corrupted, lost, or can fail to catch the attention of a user or an application. Therefore, as the invention recognizes, present inodes and their equivalents expose the contents to a data security risk.

A content inode in accordance with an illustrative embodiment may be configured to track the contents of a file as well as any mirrors of the file. Accordingly, the illustrative embodiment may allow an application to recognize an existing mirror of a file when only looking for the file without referring or knowing of an external mirroring record. The application, such as an audit application, may then be able to report that as a result of mirroring operation 506, not only blocks 504 and 506, but also blocks 512 and 514 in mirror location data storage 510 should be regarded as containing the file's contents. Thus, the illustrative embodiment may provide improved data security to the file contents as compared to presently used inodes and similar data structures in present file systems.

In another embodiment, operation 508 may be a copy operation. As an example, copy operation 506 may have been performed to create a backup of the contents of the file in data storage 502. Data storage 516 is the post-copy location for the backup of the file contents from data storage 502.

During copy operation 506, contents are copied from data storage 502 to example blocks 518 and 520 in backup location in data storage 510. The invention recognizes that having blocks of content copied in this manner poses a security risk. For example, an application tracking the file using present inodes will only find the file in blocks 504 and 506 in data storage 502 and not the copy of the file in blocks 518 and 520 in data storage 516. While the copy of the file in data storage 516 itself has an inode, that inode is different from the inode referencing the file in data storage 502. Accordingly, external records have to be maintained that inform an application that a copy of the file exists elsewhere and should also be considered. Such records, being external to the inode of the file can easily become outdated, disassociated with the file, corrupted, lost, or can fail to catch the attention of a user or an application. Therefore, as the invention recognizes, present inodes and their equivalents expose the contents to a data security risk.

A content inode in accordance with an illustrative embodiment may be configured to track the contents of a file as well as any copies of the file. Accordingly, the illustrative embodiment may allow an application to recognize an existing copy of a file when only looking for the file without referring or knowing of an external copy or backup record. The application, such as an audit application, may then be able to report that as a result of copy operation 506, not only blocks 504 and 506, but also blocks 518 and 520 in backup location data storage 516 should be regarded as containing the file's contents. Thus, the illustrative embodiment may provide improved data security to the file contents as compared to presently used inodes and similar data structures in present file systems.

Figure 6:
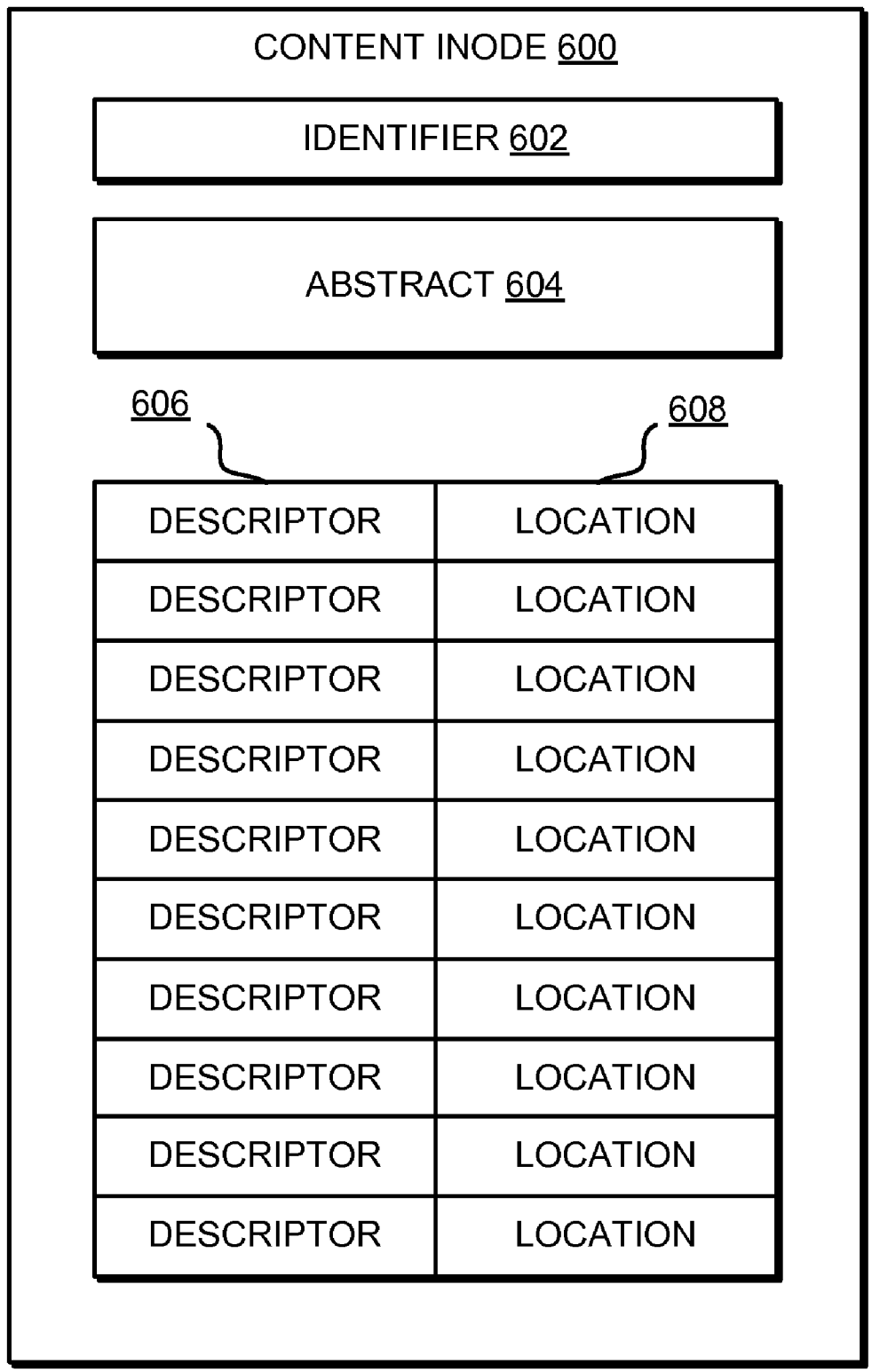
FIG. 6 depicts a block diagram of a content inode in accordance with an illustrative embodiment.

With reference to FIG. 6, this figure depicts a block diagram of a content inode in accordance with an illustrative embodiment. Content inode 600 may include features of presently used inode or similar data structure, and additional features according to the illustrative embodiment. Content inode 600 may participate in a present file system, such as file system 105 in FIG. 1, in a manner similar to the participation of an inode in the present file systems.

Content inode 600 may include identifier 602, which may uniquely identify content inode 600 in a file system. Optionally, content inode 600 may also include abstract 604 as described previously.

Content inode 600 may further include set of descriptors 606. A descriptor is an identifier of an operation that can be performed with respect to content. A set of descriptors is one or more descriptors.

Content inode 600 may further include set of location identifiers 608, a location identifier in the set of location identifiers corresponding to a descriptor in the set of descriptors. A location identifier is an identifier that may be used to locate a result of the operation of the descriptor. A set of location identifiers is one or more location identifiers.

For example, "defragment" may be a descriptor corresponding to the defragmentation operation. A location identifier corresponding to the defragment descriptor may be the address of the freed blocks from where the content was moved.

As another example, "mirror" descriptor may correspond to the mirroring operation. A location identifier corresponding to the mirror descriptor may be an address or a URL where a mirror of the content may be found.

As another example, "copy" descriptor may correspond to the copy operation. A location identifier corresponding to the copy descriptor may be an address, a path, or a URL where a copy of the content may be found.

As another example, "backup" descriptor may correspond to a backup operation. A location identifier corresponding to the backup descriptor may be an address or a URL where a backup of the content may be found. The location identifier may additionally provide information about a type of media used for the backup, or other additional information.

As another example, "remove" descriptor may correspond to a remove operation. A location identifier corresponding to the remove descriptor may be an address or a URL where the original content was located prior to removal to the new location.

The examples of descriptors and location identifiers are provided here only for clarity of the illustrative embodiments and are not limiting on the invention. Any operation may be associated with a descriptor, and a descriptor may be created for any operation.

For example, a descriptor may identify an application or a component instead of an operation. For example, "ftp" may be a descriptor for a FTP operation, or an FTP application, or an FTP service of an operating system, and may correspond to one or more location identifiers pointing to one or more target ftp locations. For example, a location identifier may include the hostname and IP address of target host as well as the file system information referencing the new file created on the target host.

As an extension of this example and for similar circumstances, in one embodiment, the target host may also support content inodes. In such an embodiment, the content inode of the original content may include additional descriptors to point to the content inode for the new files on the target host. An implementation may choose to not allow a particular operation, component, or application, such as FTP, to be used on a file associated with a content inode.

As another example, "vies" descriptor may correspond to a virtual I/O service or operation. A corresponding location identifier may point to a virtual I/O server, if a virtual device was created that was supported by a server host. The content inode may include information describing how to obtain file data associated the current client host on the virtual device server host. For example, such information may be incorporated in a location identifier, which would include hostname, IP address, and any other translation information to reference data on the server.

As an extension of this example, and for other similar circumstances, a server host may also support content inodes. In such an embodiment, the content inode of the client host may include descriptors referencing the content inode and content label on the virtual I/O server.

A descriptor may be defined for any operation, component, or application that transfers, manipulates, or otherwise operates with respect to file contents. For example, as virtual layers are added to an operating system, for any commands associated with those virtual layers, a descriptor may be defined or added for any operation that operates with respect to the data for that layer. For example, "dd" may be a descriptor for a "dd" command that transfers data between the virtual layers for debugging purposes.

An implementation of content inodes may track some operations, components, or applications and not others without limitation. For example, an implementation in a virtual layers environment may track content progression only at certain levels or layers.

A descriptor may or may not be associated with a location identifier, more than one location identifiers, identifiers other than a location identifier, or a combination thereof. Furthermore, a particular descriptor may be included any number of times in content inode 600 without limitation. An instance of a descriptor may correspond to same or different location identifiers as compared to other instances of same or different descriptors.

Additionally, a location identifier may store location information in any form suitable for a particular implementation within the scope of the illustrative embodiments. For example, in one embodiment, a location identifier may be a memory address. In another embodiment, the location identifier may be a URL. In another embodiment, the location identifier may be a network path. In another embodiment, the location identifier may be a name. In another embodiment, the location identifier may include a combination of types of locations and ways of addressing those locations.

Content inodes may be used in a file system in combination with presently used inodes or similar data structures. Furthermore, a file system may treat the content tracked using content inode differently from files referenced by inodes. For example, a file system may prevent certain operations on content associated with content inodes instead of tracking them. An implementation may determine and configure freely how the content inodes handle various operations within the scope of the invention.

Figure 7:
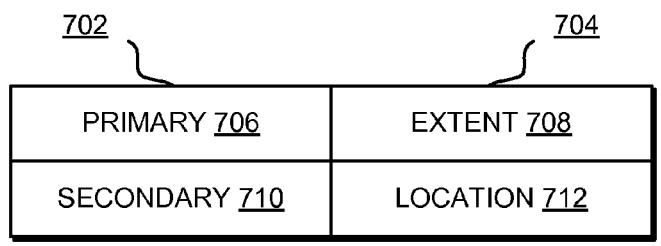
FIG. 7 depicts a block diagram of additional descriptors and corresponding location identifiers that may be incorporated in a content inode in accordance with an illustrative embodiment.

With reference to FIG. 7, this figure depicts a block diagram of additional descriptors and corresponding location identifiers that may be incorporated in a content inode in accordance with an illustrative embodiment. Descriptors 702 may be included in set of descriptors 606 in FIG. 6. Location identifiers 704 may be included in set of location identifiers 608 in FIG. 6.

A content inode, such as content inode 600 in FIG. 6, may be created at the time a file is created with content in a file system, or may be created for an existing file with content. When a content inode is created when a new file is created, the content inode may include a reference to the inode of the file, if an inode is also created. Such a reference to the inode may be included as a primary descriptor in the set of descriptors in the content inode. A primary descriptor is an initial descriptor that indicates that the initiation operation of the content inode is the creation of an inode. Descriptor 706 is such a descriptor, and location identifier 708 is a location identifier referring to the inode's location.

In one embodiment, primary descriptor 706 may replace the inode completely in the file system. In such an embodiment, descriptor 706 and location identifier 708 may include a data structure similar to the data structure of the inode. In such an embodiment, location identifier 708 may be the extent for addressing the file in the data storage device. An extent is a series of 3-tuples that give the file offset, offset in media, and the length of data so that the data can be located on the data storage medium.

When a content inode is created when a new file is created, the content inode can track content manipulations from the time of origin of the content. Such tracking may include adding one or more descriptors and one or more corresponding location identifiers to the content inode, thus building a history of content manipulation, when a manipulation of the content occurs.

When a content inode is created for a pre-existing file, generally a content inode can track content manipulations from the time of origin of the content inode. However, a content inode can be populated with one or more descriptor 710 and one or more location identifier 712 corresponding to content manipulations that may have occurred with respect to the content prior to the creation of the content inode.

For example, a mirror of a file may have been created before the content inode for the file is created. In one embodiment, the content inode can include a descriptor and location identifier for the mirror operation if such information is incorporated from an external record into the content inode at the time of content inode's creation.

In another embodiment, the content inode may be initially created without the knowledge of the existing mirror. However, when a request to refresh the mirror file is made, an illustrative embodiment may trap such a request and detect the presence of the mirror file. Based on this or similar detection, descriptor 710 and location identifier 712 referencing the mirror file can be added to the content inode.

The examples of methods for populating a content inode with prior operations information are only described for the clarity of the illustrative embodiment and are not limiting on the invention. Other ways of adding descriptors and location identifier for operations prior to the content inode creation can be implemented from this disclosure without departing the scope of the invention.

With reference to FIG. 8, this figure depicts an example pseudo-code for implementing a portion of the content inode in accordance with an illustrative embodiment. Code 800 may be used to implement parts of content inode 600 in FIG. 6.

With reference to FIG. 9, this figure depicts an example pseudo-code for implementing another portion of the content inode in accordance with an illustrative embodiment. Code 900 may be used to implement parts of content inode 600 in FIG. 6.

Particularly, code 900 and similar code can be used to implement various descriptors, location indicators, treatments of various operations, components, and applications that may operate with respect to the content. Furthermore, a combination of code 800 in FIG. 8, code 900, and other similarly purposed code can be used to implement rules for allowing, prohibiting, and tracking various operations, components, and applications that may operate with respect to the content.

With reference to FIG. 10, this figure depicts a flowchart of a process for tracking file contents in accordance with an illustrative embodiment. Process 1000 may be implemented in an operating system, such as operating system 304 in FIG. 3.

Process 1000 begins by creating a content inode for a content (step 1002). Process 1000 receives information about an operation on the content (step 1004). In one embodiment, process 1000 may receive information about a component or an application operating on the content in step 1004.

Process 1000 modifies an existing descriptor or adds a new descriptor corresponding to the operation of step 1004 along with one or more location identifiers (step 1006). For example, in one embodiment, a content inode may be created with several placeholder descriptors, and a placeholder descriptor may be modified to hold a descriptor corresponding to an actual operation at a later time. In another embodiment, a descriptor may be newly added to the content inode at the time of the operation.

Process 1000 may optionally modify the abstract portion of the content inode (step 1008). Process 1000 may determine whether to continue monitoring the content for tracking any manipulations thereto (step 1010).

If process 1000 determines that the process has to monitor the content ("Yes" path of step 1010), process 1000 returns to step 1004. If process 1000 determines that the monitoring of the content can end ("No" path of step 1010), process 1000 ends thereafter.

With reference to FIG. 11, this figure depicts a flowchart of a process of creating a content inode in accordance with an illustrative embodiment. Process 1100 may be implemented as step 1002 in process 1000 in FIG. 10.

Process 1100 begins by creating a content inode based on the inode that is created for a new content (step 1102). Process 1100 ends thereafter.

In one embodiment of step 1102, process 1100 may create a content inode and add a primary descriptor to the content inode based on the inode for the content, as described with respect to FIG. 6 above. In another embodiment of step 1102, process 1100 may create the content inode including a data structure sufficient to accommodate the inode attributes along with the primary descriptor. Each embodiment may also populate one or more location identifiers corresponding to the primary descriptor as may be suitable for that embodiment.

With reference to FIG. 12, this figure depicts a flowchart of a process of modifying a content inode referencing an existing content in accordance with an illustrative embodiment. Process 1200 may be implemented in an operating system, such as operating system 304 in FIG. 3.

Process 1200 begins by creating a content inode based on an inode for an existing content (step 1202). Process 1200 discovers related content (step 1204).

For example, a mirror file may request an update from the original content, thereby revealing the existence of the mirror to step 1204 of process 1200. As another example, a previously scheduled backup job may execute or a previously made backup may be restored after the content inode is created, thereby revealing the existence of a backup copy to step 1204. As another example, a database component may send a synchronization request to the original database content, thereby revealing the existence of another database with related content to step 1204. These examples are not intended to be limiting on the invention. Many other processes, events, and occurrences to deduce the existence of related content will be conceivable to those of ordinary skill in the art from this disclosure and the same are contemplated within the scope of the invention.

Process 1200 adds or modifies a descriptor information referring to the related content (step 1206). For example, process 1200 may add a secondary descriptor based on an inode of the discovered related content to the content inode of the original content. Process 1200 may also add one or more location identifiers to reference the inode or other location aspect of the related content.

Process 1200 may then determine whether to monitor for any manipulations with respect to the original content, the related content, or both (step 1208). Note that once related content is discovered or identified in the content inode of the original content, process 1200 can modify the content inode of the original content based on any manipulation of the related content as well.

If process 1200 determines to monitor or continue monitoring the original content, related content, or both ("Yes" path of step 1208), process 1200 returns to step 1204. If process 1200 determines to terminate monitoring ("No" path of step 1208), process 1200 ends thereafter.

With reference to FIG. 13, this figure depicts a flowchart of an example process of using the content in accordance with an illustrative embodiment. Process 1300 may be implemented in an operating system, such as operating system 304 in FIG. 3. Alternatively, process 1300 may be implemented in another application that uses inodes or explores file systems, such as an auditing or security application.

Process 1300 begins by requesting a content history of a file (step 1302). History of a content is the history of manipulations or operations with respect to the content.

Process 1300 retrieves all or some of the descriptors from one or more content inodes associated with the content (step 1304). Note that more than one content inodes may be associated with a content such that a content inode may reference another content inode as a secondary descriptor.

Process 1300 retrieves content or content fragments based on the location identifiers associated with each descriptor (step 1306). Process 1300 publishes the locations or content from those locations (step 1308). Process 1300 ends thereafter.

Process 1300 may publish the locations of content, the content at those locations, or a combination thereof, in any manner suitable for a particular implementation. For example, in one embodiment, process 1300 may publish using a peripheral of a computer, such as a display screen or a printer. In another embodiment, process 1300 may publish to a database or another data storage device or application. In another embodiment, process 1300 may publish to a web server application across a data network.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for tracking file contents. Using the embodiments of the invention, an application may track content, fragments of the content, or related content in addition to tracking the file in the file system.

Because the file systems and applications using them are becoming increasingly complex, contents of files can easily be distributed or scattered without the knowledge of the file system and can cause a security breach in a data processing system. Virtual I/O environments add to this complexity. Using the invention, such content, fragments, and related content can be tracked within the file system of the data processing systems including virtual I/O systems, distributed systems, and logical partitioned systems.

The invention provides a comprehensive knowledge of where the contents of files are at any given time. With this knowledge, an application can secure the contents in ways not possible with present file system data structures.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for tracking file content in a computer memory, the computer implemented method comprising:

creating a content inode corresponding to a content, the content being a part of a file, the file being stored in a computer memory, and the file being locatable using a file system executing under an operating system in a data processing system, wherein the content inode is created for a pre-existing file;

detecting one of (i) an operation, (ii) a component, and (iii) an application, operating with respect to the content;

determining a descriptor and a location corresponding to the one of the operation, the component, and the application;

adding the descriptor to the content inode;

adding a location identifier corresponding to the location to the content inode, the content inode with the added descriptor and location identifier enabling a second application to learn about the one of the operation, the component, and the application having operated with respect to the content;

discovering a related content, the related content being related to the content referenced by the content inode;

adding a second descriptor to the content inode, the second descriptor referencing one of (i) an inode of the related content, and (ii) the related content;

adding a second location identifier corresponding to the second descriptor, the second location identifier referencing one of (i) a location of the inode of the related content, and (ii) a location of the related content; and adding a third descriptor to the content inode, the third descriptor corresponding to one of an operation, a component, and an application that formed a basis of discovering the related content.

2. The computer implemented method of claim 1, wherein the content inode is created when the file is created, creating the content inode further comprising:
   adding a primary descriptor to the content inode based on an inode for the file; and
   adding a location identifier corresponding to the primary descriptor to the content inode.

3. The computer implemented method of claim 1, wherein the content inode is created when the file is created, creating the content inode further comprising:
   adding a first descriptor to the content inode, the first descriptor including a data structure suitable for storing inode attributes.

4. The computer implemented method of claim 1, wherein the operation is one of (i) defragmentation, (ii) copy, (iii) mirror, (iv) remove, (v) read, (vi) write, (vii) delete, and (viii) backup, wherein the component is one of (i) FTP, and (ii) virtual I/O server.

5. The computer implemented method of claim 1, further comprising:
   requesting a content history of the content;
   retrieving a set of descriptors and a set of corresponding location identifiers from the content inode of the content;
   determining a content fragment at a first location corresponding to a first location identifier in the set of location identifiers; and
   publishing the content fragment.

6. The computer implemented method of claim 5, further comprising:
   publishing the first location corresponding to the location identifier.

7. The computer implemented method of claim 1, wherein the content inode references a second content by including a descriptor for a second content inode in the content inode.

8. The computer implemented method of claim 1, further comprising:
   modifying an abstract of the content inode such that the abstract contains a description of a history of manipulations of the content.

9. A computer usable program product comprising a computer usable storage medium device including computer usable code for tracking file content in a computer memory, the computer usable code comprising:
   computer usable code for creating a content inode corresponding to a content, the content being a part of a file, the file being stored in a computer memory, and the file being locatable using a file system executing under an operating system in a data processing system, wherein the content inode is created for a pre-existing file;
   computer usable code for detecting one of (i) an operation, (ii) a component, and (iii) an application, operating with respect to the content;
   computer usable code for determining a descriptor and a location corresponding to the one of the operation, the component, and the application;
   computer usable code for adding the descriptor to the content inode;
   computer usable code for adding a location identifier corresponding to the location to the content inode, the content inode with the added descriptor and location identifier enabling a second application to learn about the one of the operation, the component, and the application having operated with respect to the content;
   computer usable code for discovering a related content, the related content being related to the content referenced by the content inode;
   computer usable code for adding a second descriptor to the content inode, the second descriptor referencing one of (i) an inode of the related content, and (ii) the related content;
   computer usable code for adding a second location identifier corresponding to the second descriptor, the second location identifier referencing one of (i) a location of the inode of the related content, and (ii) a location of the related content; and
   computer usable code for adding a third descriptor to the content inode, the third descriptor corresponding to one of an operation, a component, and an application that formed a basis of discovering the related content.

10. The computer usable program product of claim 9, wherein the content inode is created when the file is created, the computer usable code for creating the content inode further comprising:
   computer usable code for adding a primary descriptor to the content inode based on an inode for the file; and
   computer usable code for adding a location identifier corresponding to the primary descriptor to the content inode.

11. The computer usable program product of claim 9, wherein the content inode is created when the file is created, the computer usable code for creating the content inode further comprising:
   computer usable code for adding a first descriptor to the content inode, the first descriptor including a data structure suitable for storing inode attributes.

12. The computer usable program product of claim 9, further comprising:
   computer usable code for requesting a content history of the content;
   computer usable code for retrieving a set of descriptors and a set of corresponding location identifiers from the content inode of the content;
   computer usable code for determining a content fragment at a first location corresponding to a first location identifier in the set of location identifiers; and
   computer usable code for publishing the content fragment.

13. The computer usable program product of claim 9, further comprising:
   computer usable code for modifying an abstract of the content inode such that the abstract contains a description of a history of manipulations of the content.

14. The computer usable program product of claim 9, wherein the computer usable code is stored in a computer readable storage medium in a data processing system, and wherein the computer usable code is transferred over a network from a remote data processing system.

15. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

16. A data processing system for tracking file content, the data processing system comprising:

a computer usable storage device including a computer usable storage medium, wherein the computer usable storage device stores computer usable program code; and a processor, wherein the processor executes the computer usable program code, and wherein the computer usable program code comprises:

computer usable code for creating a content inode corresponding to a content, the content being a part of a file, the file being stored in a computer memory, and the file being locatable using a file system executing under an operating system in a data processing system, wherein the content inode is created for a pre-existing file;

computer usable code for detecting one of (i) an operation, (ii) a component, and (iii) an application, operating with respect to the content;

computer usable code for determining a descriptor and a location corresponding to the one of the operation, the component, and the application;

computer usable code for adding the descriptor to the content inode;

computer usable code for adding a location identifier corresponding to the location to the content inode, the content inode with the added descriptor and location identifier enabling a second application to learn about the one of the operation, the component, and the application having operated with respect to the content;

computer usable code for discovering a related content, the related content being related to the content referenced by the content inode;

computer usable code for adding a second descriptor to the content inode, the second descriptor referencing one of (i) an inode of the related content, and (ii) the related content;

computer usable code for adding a second location identifier corresponding to the second descriptor, the second location identifier referencing one of (i) a location of the inode of the related content, and (ii) a location of the related content; and computer usable code for adding a third descriptor to the content inode, the third descriptor corresponding to one of an operation, a component, and an application that formed a basis of discovering the related content.

17. The data processing system of claim 16, further comprising:

computer usable code for requesting a content history of the content;

computer usable code for retrieving a set of descriptors and a set of corresponding location identifiers from the content inode of the content;

computer usable code for determining a content fragment at a first location corresponding to a first location identifier in the set of location identifiers; and computer usable code for publishing the content fragment.

* * * * *